United States Patent [19]

Wagner et al.

[11] Patent Number: 5,064,600

[45] Date of Patent: Nov. 12, 1991

[54] PROCESS FOR PRODUCTION OF MOLDINGS OR FILMS FROM POLYISOCYANATE POLYADDUCTS BY RIM PROCEDURE

[75] Inventors: Joachim Wagner; Werner Rasshofer, both of Koeln; Ulrich Eisele, Leverkusen; Eberhard Jürgens, Koeln; Christian Weber; Erich Meier, both of Leverkusen, all of Fed. Rep. of Germany

[73] Assignee: Bayer Aktiengesellschaft, Bayerwerk, Fed. Rep. of Germany

[21] Appl. No.: 614,798

[22] Filed: Nov. 14, 1990

Related U.S. Application Data

[63] Continuation of Ser. No. 366,060, Jun. 14, 1989, abandoned, which is a continuation-in-part of Ser. No. 249,917, Sep. 27, 1988, abandoned.

[30] Foreign Application Priority Data

Oct. 6, 1987 [DE] Fed. Rep. of Germany ....... 3733756
Jan. 28, 1988 [DE] Fed. Rep. of Germany ....... 3802427

[51] Int. Cl.$^5$ .................. B29C 45/00; C08G 18/65
[52] U.S. Cl. .................. 264/328.6; 264/331.19; 528/68; 528/77
[58] Field of Search .................. 264/328.6, 331.19; 528/68, 77

[56] References Cited

U.S. PATENT DOCUMENTS

| | | | |
|---|---|---|---|
| 3,684,769 | 8/1972 | Abbott et al. | 528/81 |
| 3,970,601 | 7/1976 | Weber et al. | 524/590 |
| 4,065,410 | 12/1977 | Schäfer et al. | 521/51 |
| 4,218,543 | 8/1980 | Weber et al. | 521/51 |
| 4,261,946 | 4/1981 | Goyert | 264/211 |
| 4,296,212 | 10/1981 | Ewen et al. | 521/163 |
| 4,376,834 | 3/1983 | Goldwasser et al. | 521/159 |
| 4,448,904 | 5/1984 | Dominguez | 521/160 |
| 4,546,154 | 10/1985 | Robertson | 525/474 |
| 4,608,418 | 2/1986 | Czeswinski et al. | 524/296 |
| 4,642,320 | 2/1987 | Turner et al. | 521/176 |
| 4,659,747 | 4/1987 | Alberino et al. | 521/159 |
| 4,732,919 | 3/1988 | Grigsky, Jr. et al. | 521/159 |
| 4,774,263 | 9/1988 | Weber et al. | 521/51 |
| 4,774,264 | 9/1988 | Weber | 521/51 |
| 4,786,656 | 11/1988 | Presswood et al. | 521/159 |
| 4,791,187 | 12/1988 | Süling | 528/60 |
| 4,810,444 | 3/1989 | Alberino | 264/102 |
| 4,919,878 | 4/1990 | Pilger | 264/300 |
| 4,954,537 | 9/1990 | Sanns, Jr. | 521/157 |
| 4,983,643 | 1/1991 | Sanna, Jr. | 521/159 |

FOREIGN PATENT DOCUMENTS 1411958 10/1975 United Kingdom .

OTHER PUBLICATIONS

Becker/Braun, Kunststoff-Handbuch, vol. 7, "Polyurethane" by Carl Hanser Verlag, 1983, p. 428 et seq. (English version, corresponding pages).

Primary Examiner—Christopher Henderson
Attorney, Agent, or Firm—Joseph C. Gil

[57] ABSTRACT

The present invention relates to a process for the preparation of moldings or films based on polyisocyanate polyadducts comprising thermoplastically molding, at a temperature of at least 50° C. and at a pressure of at least 5 bar, polyisocyanate polyadducts obtained by reacting in closed molds using the reaction injection molding technique aromatic polyisocyanates; compounds having a molecular weight of from 1800 to 12,000 and containing on a statistical average at least 2.5 isocyanate-reactive groups; and one or more components selected from a diamine containing two primary and/or secondary aromatically bound amino groups and and an aliphatic or cycloaliphatic polyol or polyamine; with the provisos that the quantity of isocyanate-reactive compound is at least 30% by weight based on the total quantity of the components and that at least one of the diamine, polyol, or polyamine components comprises at least 5% by weight based on the weight of the isocyanate-reactive compound.

7 Claims, No Drawings

PROCESS FOR PRODUCTION OF MOLDINGS OR FILMS FROM POLYISOCYANATE POLYADDUCTS BY RIM PROCEDURE

This application is a continuation of application Ser. No. 07/366,060 filed June 14, 1989 now abandoned which is a continuation-in-part of application Ser. No. 07/249,917, filed Sept. 27, 1988 now abandoned.

BACKGROUND OF THE INVENTION

This invention relates to a process for the production of moldings or films based on polyisocyanate polyadducts containing urea groups and, optionally, urethane groups by thermoplastic molding. The polyisocyanate polyadducts are based on compounds of relatively high functionality containing isocyanate-reactive atoms and having a high urea content.

Thermoplastic polyurethane elastomers are know. See, for example, Becker/Braun, *Kunststoff-Handbuch,* Vol. 7, "Polyurethane", Carl Hanser Verlag, Munich/Vienna (1983), pages 428 et seq. The previously known thermoplastically processible polyurethane elastomers are based on diisocyanates, relatively high molecular weight dihydroxy compounds (more especially polyester diols of relatively high molecular weight), and low molecular weight diols as chain-extending agents. Such polyurethanes reportedly have a linear structure; i.e. they do not contain crosslinking or branching sites in the molecule. The use of diamines as chain-extending agents in the production of thermoplastically processible polyurethane elastomers has also been disfavored in the past (see the above-cited handbook, page 428, section 8.2.1), because urea groups which are regarded as hard segments that create an obstacle to thermoplastic processing are incorporated into the molecule when diamine chain-extending agents are used.

Until now it has been assumed that moldings produced by reaction injection molding would not lend themselves to thermoplastic processing because of the use of compounds having relatively high molecular weight and relatively high functionality and containing isocyanate-reactive hydrogen atoms, particularly when used in the presence of high concentrations of incorporated urea groups. For this reason, closed molds corresponding in shape to the shape of the desired end product (for example, automobile fenders) have been used for the production of elastomers.

However, it has now surprisingly been found that even polyisocyanate polyadducts containing urea groups in greater numbers than the urethane groups, and which in addition have been prepared using branched, relatively high molecular weight synthesis components containing isocyanate-reactive groups, lend themselves to thermoplastic processing. It has also been found that the favorable mechanical properties of these polyisocyanate polyadducts are not adversely affected by thermoplastic molding, irrespective of whether the polyisocyanate polyadducts contain fillers and/or reinforcing materials.

The process according to this invention makes it possible to mold elastomeric polyisocyanate polyadducts, which correspond chemically to the above-mentioned products of the prior art, by thermoplastic molding. Thus, there is no longer any need for molding during production using molds corresponding to the desired end product.

SUMMARY OF THE INVENTION

The present invention relates to a process for the preparation of moldings or films based on polyisocyanate polyadducts comprising thermoplastically molding, at a temperature of at least 50° C. and at a pressure of at least 5 bar, polyisocyanate polyadducts having a density of at least 0.8 g/cm$^3$, wherein said polyisocyanate polyadducts are obtained by reacting in closed molds using the reaction injection molding technique in one or more stages at an isocyanate index of from about 60 to about 140 a) aromatic polyisocyanates;
b) compounds having a molecular weight of from 1800 to 12,000 and containing on a statistical average at least 2.5 isocyanate-reactive groups; and
c) one or more components selected from
  (i) diamines containing two primary and/or secondary aromatically bound amino groups and having a molecular weight range of from 108 to 400, and
  (ii) aliphatic or cycloaliphatic polyols or aliphatic or cycloaliphatic polyamines having a molecular weight of from 60 to 1799; and
optionally also
d) auxiliaries and additives known per se from polyurethane chemistry;

with the proviso that the quantity of component b) is at least 30% by weight based on the total quantity of components a), b), and c), and with the further proviso that at least one of the components (i) or (ii) is used in a quantity such that the total quantity of components c) is at least 5% by weight based on the weight of component b).

The polyisocyanate polyadducts used in the process according to this invention are elastomers preferably having a density in the range from 0.8 to 1.4 g/cm$^3$. The particularly preferred density range is from 1.0 to 1.3 g/cm$^3$. Elastomers such as these are known per se and have generally been produced by reaction injection molding in closed molds. See, for example, DE-AS 2,622,951, DE-OS 3,133,859, U.S. Pat. No. 4,065,410, U.S. Pat. No. 4,218,543 and EP-B 81,701.

DESCRIPTION OF THE INVENTION

The polyisocyanate polyadducts processed by thermoplastic molding using the process according to this invention are reaction products of the above-mentioned starting materials.

The type and amount of the starting components a), b), and c) are selected so that the resultant polyisocyanate polyadducts are not melted under normal thermoplastic conditions and cannot, therefore, be processed using conventional screw extruders. As used herein, the term "thermoplastically molded" means that the materials processed using that method soften under the temperature and pressure conditions of the process of the invention, thereby allowing the materials to be molded in presses.

Suitable aromatic polyisocyanates a) are, in particular, the compounds mentioned in EP-B 81,701, column 3, line 30 to column 4, line 25, the preferred polyisocyanates mentioned therein also being preferred for the purposes of this invention.

Component b) is a compound containing isocyanate-reactive groups and having a molecular weight in the range from 1800 to 12,000 (preferably in the range from 3000 to 7000) or a mixture of such compounds. Component b) has an (average) functionality of more than 2.5 in the context of the isocyanate addition reaction, preferably with an (average) functionality of 2.5 to 3.0 and more preferably from 2.8 to 3.0. Compounds particularly suitable as component b) are polyether polyols or mixtures of polyester polyols of the type disclosed in DE-AS 2,622,951, column 6, line 65 to column 7, line 47. Polyether polyols in which at least 50% and preferably at least 80% of the hydroxyl groups consists of primary hydroxyl groups are preferred for the purposes of the invention. Hydroxyl-containing polyesters, polythioethers, polyacetals, polycarbonates, or polyester amides disclosed, for example, in DE-AS 2,622,951, are also in principle suitable as component b) according to this invention as long as they satisfy the above requirements, but they are not as preferred as polyether polyols.

Also suitable as starting component b) are aminopolyethers which satisfy the above requirements or mixtures of such aminopolyethers. That is, suitable polyethers contain isocyanate-reactive groups of which at least 50 equivalent percent and preferably at least 80 equivalent percent are aromatically or aliphatically bound primary and/or secondary (preferably aromatically bound) amino groups and the remainder are aliphatically bound primary and/or secondary hydroxyl groups. Suitable aminopolyethers include, for example, the compounds mentioned in EP-B 81,701, column 4, line 26 to column 5, line 40.

Mixtures of the polyhydroxyl compounds with the aminopolyethers may, of course, also be used as component b).

The quantity of component b) is selected so as to comprise at least 30% by weight (preferably at least 40% by weight) of the combined weights of components a), b), and c).

Component c)(i), which is optional, is an aromatic diamine of the type mentioned by way of example in EP-B 81,701, column 5, line 58 to column 6, line 34, the preferred diamines mentioned therein also being preferred for the purposes of the present invention.

The polyols or polyamines used as optional component c)(ii) include any non-aromatic compounds containing at least two isocyanate-reactive groups and having a molecular weight in the range from 60 to 1,799, preferably in the range from 62 to 500 and more preferably in the range from 62 to 400. Suitable synthesis components of this type are, for example, polyhydric alcohols of the type disclosed in EP-B 81,701, column 9, lines 32 to 50. It is also possible, for example, to use aliphatic polyamines containing ether groups, such as polypropylene oxides containing terminal primary amino groups and having a molecular weight in the above-mentioned range. Polyols containing cycloaliphatic rings, such as 1,4-dihydroxycyclohexane or 1,4-bis(hydroxymethyl)cyclohexane, may also be used.

An important requirement is that at least one of the components c) is used in the production of the polyisocyanate polyadduct elastomers in such quantities that the proportion by weight of components c), based on the weight of component b), is at least 5% by weight and preferably at least 10% by weight. In a particularly preferred embodiment, the elastomers are prepared using only aromatic diamines of the type mentioned by way of example under c)(i), with their quantity and the quantity of any amino groups present in component b) being selected in such a way that the molar ratio of urea groups to urethane groups in the elastomers is at least 2:1.

The auxiliaries and additives d) optionally used in the production of the polyisocyanate polyadducts include, for example, internal mold release agents, catalysts for the additives, cell regulators, pigments, dyes, flameproofing agents, stabilizers, plasticizers, and fungistatic or bacteriostatic agents, as described, for example, in EP-B 81,701, column 6, line 40 to column 9, line 31.

Preferred optional auxiliaries and additives include known fillers and reinforcing materials, such as, for example, barium sulfate, kieselguhr, whiting, mica or, more particularly, glass fibers, LC fibers, glass flakes, glass beads, or carbon fillers. These fillers and reinforcing materials may be used in quantities of up to 80% by weight and preferably in quantities of up to 30% by weight, based on the total weight of the filled or reinforced polyisocyanate polyadducts.

The polyisocyanate polyadducts are preferably produced by the one-shot process by mixing the polyisocyanate component a) with a mixture of the remaining components and reacting the resulting mixture using suitable mixers. It is also possible in principle to form the polyisocyanate polyadducts by a "modified one-step process" in which the polyisocyanate component a) is reacted with part of component b) and, optionally, component c)(ii) to form NCO semiprepolymers. The NCO semiprepolymers are then reacted in one step with a mixture of the remaining components. It is also possible in principle to produce the elastomers by the conventional prepolymer process. The NCO index (that is, the number of NCO groups divided by the number of NCO reactive groups and multiplied by 100) is always 60 to 140, preferably 80 to 120 and more preferably 95 to 115.

As already mentioned, the quantity of component c)(i) (including any amino groups present in component b)) is preferably selected in such a way that the molar ratio of urea groups to urethane groups in the elastomers is at least 2:1 and more preferably at least 5:1. In practice, this means that component c)(i) is preferably used in a quantity of 5 to 50% by weight and more preferably in a quantity of 10 to 40% by weight, based on the weight of component b).

The polyisocyanate polyadducts are produced by reaction injection molding ("RIM") in closed molds, as described, for example, in DE-AS 2,622,951, U.S. Pat. No. 4,218,543, or EP-B 81,701. The moldings produced by the RIM process may be used as formed or may be reduced in size for the thermoplastic processing step. However, although less preferred, it is also possible to produce the polyisocyanate polyadducts without using molds, for example by applying the reaction mixture as it leaves a mixer to suitable supports (for example metal plates), where it is allowed to react.

The polyisocyanate polyadducts preferably have a density of 0.8 to 1.4 g/cm$^3$ and more preferably 1.0 to 1.3 g/cm$^3$. This means that blowing agents are used, albeit in small quantities, to obtain a certain microporous structure or to make the reaction mixture easier to process (e.g., by giving improved flow).

The process according to the invention may be carried out (i.e., the polyisocyanate polyadducts may be thermoplastically processed) using any known apparatus suitable for this purpose, such as, for example, extruders or presses.

The polyisocyanate polyadducts are suitable for thermoplastic molding in accordance with the invention in a variety of different starting forms. For example, sheets which have been produced by reaction injection molding in closed sheet molds may be further shaped in deep-draw presses or may be thermoplastically processed in size-reduced form (granulates of powders) to form new moldings. Such moldings may, of course, also contain reinforcing mats such as, for example, glass fiber mats. The same processing methods also apply, of course, to the polyisocyanate polyadducts produced without using molds. Polyisocyanate polyadducts present in sheet form may also be further processed into films of any thickness.

The possibility afforded by this invention of thermoplastically molding polyisocyanate polyadducts enables moldings to be produced even from granulates, chips and/or other small and ultrasmall fragments of the type which accumulate as secondary products or waste, for example in the production and use of moldings based on polyisocyanate polyadducts, and which hitherto have always been discarded or burned.

In general, the thermoplastic processing of the polyisocyanate polyadducts is carried out under a pressure of at least 5 bar, preferably under a pressure of 50 to 400 bar and more preferably under a pressure of 100 to 200 bar, at a temperature of at least 50° C., preferably at a temperature of 100° to 200° C. and more preferably at a temperature of 130° to 170° C., for molding times varying from 1 second to 10 minutes. It is, of course, necessary for any given elastomer to apply relatively high temperatures within the ranges mentioned for low pressures within the ranges mentioned and vice versa.

The thermoplastic processing may be carried out by introducing the polyisocyanate polyadduct in the apparatus which is used for the thermoplastic processing (e.g., a press) which is heated or has been heated to the temperature at which the thermoplastic processing takes place. The heating of the polyisocyanate polyadduct is in this case a consequence of its contact with the hot apparatus.

However, it is not always necessary to heat the apparatus to the temperature at which the thermoplastic processing takes place if, before it is introduced in the apparatus, the polyisocyanate polyadduct itself is heated to the temperature at which the thermoplastic processing takes place. In such case, a heating of the apparatus itself is not necessary.

The excellent mechanical properties of the polyisocyanate polyadducts are not only not adversely affected, but in many cases can even be improved, by the molding process according to the invention.

The invention, which is set forth in the foregoing disclosure, is not to be construed or limited either in spirit or in scope by these examples. Those skilled in the art will readily understand that known variations of the conditions of the following preparative procedures can be used. In the following examples, all percentages are percentages by weight and all temperatures are degrees Celsius unless otherwise noted.

EXAMPLES

Example 1

Production of Polyisocyanate Polyadducts

A-component

An A-component was obtained by combining 77 parts by weight of a polyether triol (OH value 28), prepared by propoxylation of trimethylolpropane and subsequent ethoxylation of the propoxylation product (PO:EO ratio by weight 83:17); 23 parts by weight of a mixture of 65 parts by weight 1-methyl-3,5-diethyl-2,4-diaminobenzene and 35 parts by weight 1-methyl-3,5-diethyl-2,6-diaminobenzene ("DETDA"); 0.3 parts by weight triethylenediamine; and 0.1 part by weight of a commercial tin catalyst (UL 28, a product of Witco Co.).

B-component

A modified polyisocyanate having an NCO content of 24.5% was prepared by reaction of 4,4'-diisocyanatodiphenylmethane with a substoichiometric quantity of tripropylene glycol.

Production of Moldings a) A positively controlled single-piston high-pressure dosing machine with an MQ mixing head (Maschinenfabrik Hennecke, Sankt Augustin) was used for the production of moldings.

100 parts by weight of the A-component and 51 parts by weight of the B-component (NCO index 100) were thoroughly mixed together in the above-mentioned mixer. The resulting mixture was processed by reaction injection molding in a closed plate mold to form plates measuring $300 \times 200 \times 4$ mm. The raw-material temperature was 35°–40° C. and the temperature of the mold was 60° C. Before the mold was filled, its inner walls were coated with a commercial wax-based external release agent (Acmos-Fluoricon 36/34, a product of Acmos). The filling time was 1.25 seconds and the in-mold time 30 seconds. Plate-form polyisocyanate polyadducts having a density of 1.1 g/cm$^3$ were obtained in this way.

b) The production process described in a) was modified by variation of the isocyanate index. 56.5 parts by weight of the B-component (NCO index 110) were used for each 100 parts by weight of the A-component. Plate-form polyisocyanate polyadducts having a density of 1.1 g/cm$^3$ were obtained in this way.

c) The procedure described in a) was again varied by variation of the NCO index. 62 parts by weight of the B-component (NCO index 120) were used for each 100 parts by weight of the A-component. Plate-form polyisocyanate polyadducts having a density of 1.1 g/cm$^3$ were obtained in this way.

Examples 2 and 3

General Process Conditions

The production of moldings of polyisocyanate polyadducts is also described in Examples 2 and 3 below, the formulations shown below being processed as follows:
Machine: laboratory piston-type dosing machine
Mold: steel plate mold with internal dimensions of $300 \times 200 \times 4$ mm
Mixing head: MQ 8 (Hennecke, Sankt Augustin)
Working pressure: 180 bar
Filling time: 1 second
Raw-material temperatures: 65° C. (A-component) and 50° C. (B-component)
Mold temperature: 70° C.
In-mold time: 30 seconds
External mold release agent: RCTW 2006, a product of Chemtrend

Example 2

A-component

An A-component was obtained by combining 58.6 parts by weight of an aromatic aminopolyether (NH value 4), prepared by hydrolysis of an NCO prepolymer at 90° C. using a mixture of 3.5 parts by weight dimethyl-formamide, 0.1 part by weight sodium hydroxide, and 100 parts by weight water for each 1000 parts by weight of the prepolymer, and from which volatile constituents were removed by distillation. The NCO prepolymer had an NCO content of 3.4% and had been obtained by reaction of 2,4-diisocyanatotoluene with a substoichiometric quantity of a polyether mixture. The polyether mixture consisted of equal parts by weight of (i) the propoxylation product (OH value 56, OH functionality 2.4) of a mixture of water and trimethylolpropane and (ii) a polyether polyol (OH value 35) prepared by propoxylation of glycerol and subsequent ethoxylation of the propoxylation product (ratio by weight PO:EO=87:13); 28.8 parts by weight DETDA; 0.9 parts by weight of a commercial stabilizer based on a polyether polysiloxane (L 5430, a product of Union Carbide); 5.6 parts by weight of a mixture of equal parts by weight of (i) zinc stearate and (ii) the adduct of 5 moles propylene oxide with 1 mole ethylenediamine (internal release agent); and 6.1 parts by weight of a high molecular weight polyrincinoleic acid having an acid value below 5 (internal mold release agent).

B-component

Desmodur M 53 (a polyester-modified 4,4'-diisocyanatodiphenylmethane having an NCO content of 19% by weight, a product of Bayer AG, West Germany).

The components were processed under the same conditions as described above at an NCO index of 100 (Example 2a) and 110 (Example 2b) to form elastomer plates having a density of 1.15 g/cm³.

Example 3

The procedure was as in Example 2a (index 100), except that commercial glass flakes (glass flakes 1/64, a product of Owens-Corning) were added to the A-component in a quantity of 50% by weight, based on the weight of the filler-free A-component. Elastomer plates having a density of 1.29 g/cm³ were obtained.

Examples 4 to 13

Process According to the Invention

The process according to the invention is illustrated by Examples 4 to 13 below. Test specimens were introduced into a hydraulic press (Schwabenthan model 200 T) preheated to the molding temperature (T) and immediately subjected to the molding pressure (P). After molding for 2 minutes, the moldings were cooled for 3 minutes under the molding pressure in the press, which was equipped with a throughflow water cooling system.

Example 4

1-mm thick elastomer plates were obtained according to Example 1b (index 110, thickness 4 mm) under a pressure of 200 bar and at a temperature of 150° C. The thickness was defined by a spacer member in the press.

Table 1 below shows some of the mechanical data of the material before and after thermoplastic molding in accordance with the invention.

TABLE 1

|  |  | Before | After |
|---|---|---|---|
| Tensile strength | DIN 53504 | 36 MPa | 32 MPa |
| Elongation at Break | DIN 53504 | 300% | 290% |
| Shore A hardness | DIN 53505 | 88 | 88 |
| G' modulus (100° C.) | DIN 53445 | 110 MPa | 130 MPa |
| E modulus (120° C.) | ASTM D-790 | 276 MPa | 360 MPa |
| Toughness (−40° C.) | DIN 53443 | 0.4 J | 1.2 J |
| Thermal stability under |  | 230° C. | 280° C. |

TABLE 1-continued

|  | Before | After |
|---|---|---|
| load (TMA[1]) |  |  |

[1]Thermomechanical analysis, final softening

Example 5

A part measuring 20×30×4 mm was cut from a plate according to Example 1 (index 100, thickness 4 mm). This test specimen was then molded in a 20×50×10 mm box mold with stiffening ribs and external cylindrical corner reinforcements. The wall thickness of the resulting box was approximately 1 mm. The remaining material formed a plate of the same thickness (1 mm) hanging from the upper side of the box; this material was cut away.

Example 6

The method of Example 5 was repeated using a corresponding test specimen based on the polyisocyanate polyadduct produced in accordance with Example 2a. A box having the same dimensions as in Example 5 was obtained.

Example 7

The method of Example 5 was repeated using a test specimen based on the plate produced in accordance with Example 3. In addition, the molding temperature was increased to 165° C. A box having the same dimensions as in Example 5 was again obtained.

Example 8

A 0.1-mm thick film was produced from part of the plate of Example 1a (index 100, thickness 4 mm) at 150° C and under a pressure of 300 bar.

Example 9

Thinner round discs of larger diameter were molded from 27-mm diameter and 4-mm thick round discs of the plate of Example 1a. The thickness of the moldings as a function of the molding conditions is shown in Table 2.

TABLE 2

| Pressure (bar) | Sample thickness | | |
|---|---|---|---|
|  | 70° C. | 100° C. | 150° C. |
| 20 | 2.5 mm | 2.2 mm | 1.2 mm |
| 50 | 2.2 mm | 1.6 mm | 0.9 mm |
| 70 | 2.1 mm | 1.4 mm | 0.7 mm |
| 100 | 2.0 mm | 1.4 mm | 0.7 mm |
| 150 | 1.7 mm | 1.2 mm | 0.6 mm |
| 200 | 1.7 mm | 1.0 mm | 0.6 mm |
| 250 |  |  | 0.6 mm |
| 300 |  |  | 0.6 mm |
| 350 |  |  | 0.6 mm |

Example 10

The procedure was as in Example 9 using round discs o based on the plate of Example 1c. The results are shown in Table 3.

TABLE 3

| Pressure (bar) | Sample thickness | | |
|---|---|---|---|
|  | 70° C. | 100° C. | 150° C. |
| 20 | 3.0 mm | 2.5 mm | 1.2 mm |
| 50 | 2.5 mm | 2.0 mm | 1.2 mm |
| 70 | 2.5 mm | 1.7 mm | 1.0 mm |
| 100 | 2.5 mm | 1.6 mm | 1.0 mm |

TABLE 3-continued

| Pressure (bar) | Sample thickness | | |
|---|---|---|---|
| | 70° C. | 100° C. | 150° C. |
| 150 | 2.3 mm | 1.2 mm | 0.8 mm |
| 200 | 2.3 mm | 1.2 mm | 0.7 mm |
| 250 | | | 0.7 mm |
| 300 | | | 0.7 mm |
| 350 | | | 0.6 mm |

Example 11

The procedure is as in Example 9 using round discs based ion the plate of Example 2a. The results are shown in Table 4.

TABLE 4

| Pressure (bar) | Sample thickness | | |
|---|---|---|---|
| | 70° C. | 100° C. | 150° C. |
| 20 | 1.7 mm | 1.6 mm | 1.2 mm |
| 50 | 1.6 mm | 1.5 mm | 1.0 mm |
| 70 | 1.5 mm | 1.4 mm | 0.7 mm |
| 100 | 1.4 mm | 1.2 mm | 0.6 mm |
| 150 | 1.4 mm | 1.2 mm | 0.5 mm |
| 200 | 1.4 mm | 1.0 mm | 0.5 mm |
| 250 | 1.4 mm | 1.0 mm | 0.5 mm |
| 300 | 1.4 mm | 0.9 mm | 0.5 mm |
| 350 | 1.3 mm | 0.9 mm | 0.5 mm |

Example 12

The procedure is as in Example 9 using round discs of the plate of Example 2b. The results are shown in Table 5.

TABLE 5

| Pressure (bar) | Sample thickness | | |
|---|---|---|---|
| | 70° C. | 100° C. | 150° C. |
| 20 | 2.4 mm | 2.0 mm | 1.3 mm |
| 50 | 2.2 mm | 1.8 mm | 1.2 mm |
| 70 | 2.0 mm | 1.6 mm | 1.1 mm |
| 100 | 1.8 mm | 1.4 mm | 1.0 mm |
| 150 | 1.5 mm | 1.4 mm | 0.9 mm |
| 200 | 1.5 mm | 1.4 mm | 0.8 mm |
| 250 | 1.4 mm | 1.2 mm | 0.7 mm |
| 300 | 1.4 mm | 1.0 mm | 0.6 mm |
| 350 | 1.3 mm | 1.0 mm | 0.6 mm |

Example 13

Homogeneous 0.5-mm thick films were obtained from fiber-like sawing waste (length 1 to 10 mm, thickness approximately 0.5 mm), based on the material of Example 1a and accumulated during preparation of the samples, at a temperature of 150° C. and under a pressure of 250 bar.

Example 14

A part measuring 20×30×4 mm was cut from a plate according to Example 3. This test specimen was subsequently heated to 200° C. and immediately thereafter pressed in accordance with Example 5 to form a box which was very similar to the box of Example 5, the wall thickness being 2 mm. The pressing time in thi Example was 15 seconds and the pressure was 350 bar A heating of the press did not take place.

Example 15

Example 14 was repeated using the polyisocyanat( polyadduct according to Example 2a). The test speci men was heated to only 150° C. and pressed to form ; box in accordance with Example 14. The press was kep at room temperature. The pressing time was 20 second: and the pressure was 350 bar.

What is claimed is:

1. A process for the preparation of moldings or film; based on polyisocyanate polyadducts comprising thermoplastically molding, at a temperature of at least 50' C. and at a pressure of a least 5 bar, a polyisocyanate polyadduct having a density of at least 0.8 $g/cm^3$ wherein said polyisocyanate polyadduct is obtained by reacting in a closed mold using the reaction injectior molding technique in one or more stages at an isocyanate index of from about 60 to about 140
   a) an aromatic polyisocyanate;
   b) a compound having a molecular weight of from 1800 to 12,000 and containing on a statistical average at least 2.5 isocyanate-reactive groups; and
   c) one or more components selected from
      (i) a diamine containing two primary and/or secondary aromatically bound amino groups and having a molecular weight range of from 108 tc 400, and
      (ii) an aliphatic or cycloaliphatic polyol or an aliphatic or cycloaliphatic polyamine having a molecular weight of from 60 to 1799;
   with the proviso that the quantity of component b) is at least 40% by weight based on the total quantity of components a), b), and c), and with the further proviso that at least one of the components (i) or (ii) is used in a quantity such that the total quantity of component c) is at least 5% by weight based on the weight of component b).

2. A process according to claim 1 wherein component c) is selected in such a way that the polyisocyanate polyadduct has a molar ratio of urea groups to urethane groups of at least 2:1.

3. A process according to claim 1 wherein the polyol or polyamine contains one or more ether groups.

4. A process according to claim 1 wherein component b) contains on a statistical average 2.5 to 3.0 isocyanate-reactive groups.

5. A process according to claim 1 wherein the polyisocyanate polyadduct is used in the form of granules, chips, or other small or ultrasmall fragments, or a mixture thereof.

6. A process according to claim 1 wherein the polyisocyanate polyadduct is used in the form of plates.

7. A process according to claim 6 wherein the plates are thermoplastically molded by deep drawing.

* * * * *